United States Patent
Zarkadas (10) Patent No.: US 11,210,366 B2
(45) Date of Patent: Dec. 28, 2021

(54) ANALYSIS OF X-RAY SPECTRA USING FITTING

(71) Applicant: Malvern Panalytical B.V., Almelo (NL)

(72) Inventor: Charalampos Zarkadas, Almelo (NL)

(73) Assignee: MALVERN PANALYTICAL B.V., Almelo (NL)

(*) Notice: Subject to any disclaimer, the term of this patent is extended or adjusted under 35 U.S.C. 154(b) by 428 days.

(21) Appl. No.: 16/034,393

(22) Filed: Jul. 13, 2018

(65) Prior Publication Data
US 2019/0018824 A1    Jan. 17, 2019

(30) Foreign Application Priority Data
Jul. 14, 2017  (EP) ..................................... 17181512

(51) Int. Cl.
  *G06F 17/17*  (2006.01)
  *G01N 23/2252*  (2018.01)
  (Continued)

(52) U.S. Cl.
  CPC ........... *G06F 17/17* (2013.01); *G01N 23/083* (2013.01); *G01N 23/223* (2013.01);
  (Continued)

(58) Field of Classification Search
  CPC .... G06F 17/17; G01N 23/083; G01N 23/223; G01N 23/2252
  (Continued)

(56) References Cited

U.S. PATENT DOCUMENTS

| | | | |
|---|---|---|---|
| 4,048,496 A | * | 9/1977 | Albert ..................... H01J 35/30 378/45 |
| 4,260,885 A | * | 4/1981 | Albert ................... G01N 23/223 378/113 |

(Continued)

FOREIGN PATENT DOCUMENTS

| | | |
|---|---|---|
| CN | 101441165 | 5/2009 |
| CN | 102004097 | 4/2011 |

(Continued)

OTHER PUBLICATIONS

Santibáñez et al. hereafter Santibáñez ("TXRF quantification of interfering heavy metals using deconvolution, cross-correlation, and external standard calibration", 2013, John Wiley & Sons, Ltd, pp. 442-449) (Year: 2013).*

(Continued)

*Primary Examiner* — Iftekhar A Khan
(74) *Attorney, Agent, or Firm* — Leason Ellis LLP (57) ABSTRACT

A method of analysis of X-ray spectra in an instrument fits a measured sample spectrum using a combination of at least one measured reference spectrum with at least one calculated function. The method includes measuring a reference spectrum as a plurality of measured values for a plurality of energy bins from at least one reference sample; selecting a region or multiple regions of interest corresponding to a plurality of the energy bins and, for each region of interest, recording the profile for the respective plurality of energy bins from the measured reference spectrum. The method further comprises measuring a sample spectrum as a plurality of intensity values for a plurality of energy bins; and fitting the measured sample spectrum to a fit function, the fit funtion including the at least one profile in at least one respective region of interest of the measured spectrum as well as the at least one calculated function.

13 Claims, 11 Drawing Sheets

(51) Int. Cl.
*G01N 23/083* (2018.01)
*G01N 23/223* (2006.01)
(52) U.S. Cl.
CPC ... *G01N 23/2252* (2013.01); *G01N 2223/051* (2013.01); *G01N 2223/076* (2013.01)
(58) Field of Classification Search
USPC .......................................................... 703/2
See application file for complete search history.

(56) References Cited

U.S. PATENT DOCUMENTS

| | | | | | |
|---|---|---|---|---|---|
| 4,362,935 | A | * | 12/1982 | Clark, III | G01N 23/223 378/48 |
| 4,727,562 | A | * | 2/1988 | Belanger | A61B 6/5282 378/98.4 |
| 5,117,445 | A | * | 5/1992 | Seppi | A61B 6/032 378/19 |
| 5,206,174 | A | * | 4/1993 | Gehrke | G01T 1/36 250/253 |
| 5,565,982 | A | * | 10/1996 | Lee | G01J 3/2889 250/458.1 |
| 5,602,394 | A | * | 2/1997 | Dombrowski | G01J 3/2823 250/334 |
| 6,118,850 | A | * | 9/2000 | Mayo | G01N 23/2076 378/83 |
| 6,266,390 | B1 | * | 7/2001 | Sommer, Jr. | B07C 5/3427 378/45 |
| 7,120,228 | B2 | * | 10/2006 | Yokhin | G01N 23/20008 378/90 |
| 7,130,376 | B2 | * | 10/2006 | Berman | G01B 15/02 378/82 |
| 7,649,975 | B2 | * | 1/2010 | Boyden | A61B 6/506 378/45 |
| 9,554,738 | B1 | * | 1/2017 | Gulati | A61B 5/0075 |
| 9,911,569 | B2 | * | 3/2018 | van der Borst | H01J 9/14 |
| 10,126,154 | B2 | * | 11/2018 | Chazal | G01F 1/66 |
| 10,281,414 | B2 | * | 5/2019 | Hegeman | B22F 10/20 |
| 10,352,881 | B2 | * | 7/2019 | Gateshki | G01N 23/046 |
| 10,359,376 | B2 | * | 7/2019 | Kogan | G01N 23/207 |
| 10,416,101 | B2 | * | 9/2019 | Makhotkin | G01N 23/20 |
| 10,564,115 | B2 | * | 2/2020 | Pals | G01N 23/223 |
| 2002/0154732 | A1 | * | 10/2002 | Grodzins | G01N 23/223 378/46 |
| 2002/0186810 | A1 | * | 12/2002 | Hasegawa | G01N 23/223 378/6 |
| 2004/0099805 | A1 | * | 5/2004 | Ochiai | H01J 37/256 250/311 |
| 2006/0115046 | A1 | * | 6/2006 | Berman | G01N 23/201 378/70 |
| 2007/0049809 | A1 | * | 3/2007 | Bechtel | A61B 5/1495 600/316 |
| 2007/0136017 | A1 | * | 6/2007 | Wang | H01J 49/0027 702/85 |
| 2009/0067573 | A1 | * | 3/2009 | Yokhin | G01N 23/2206 378/46 |
| 2009/0086899 | A1 | * | 4/2009 | Boyden | A61B 6/503 378/45 |
| 2010/0027748 | A1 | * | 2/2010 | Rohde | G01N 23/2252 378/82 |
| 2010/0056928 | A1 | * | 3/2010 | Zuzak | A61B 5/0071 600/476 |
| 2010/0320388 | A1 | * | 12/2010 | Rosenberg | G01J 3/443 250/339.08 |
| 2012/0321039 | A1 | * | 12/2012 | Bare | G01N 23/087 378/49 |
| 2015/0092921 | A1 | * | 4/2015 | Hansford | G01N 23/20091 378/76 |
| 2015/0362500 | A1 | * | 12/2015 | Anker | G01N 23/223 424/9.42 |
| 2017/0186195 | A1 | * | 6/2017 | Lin | A61B 6/5205 |
| 2017/0276620 | A1 | * | 9/2017 | Huang | G01N 23/087 |
| 2017/0290515 | A1 | * | 10/2017 | Butte | G01J 3/4406 |
| 2019/0064084 | A1 | * | 2/2019 | Ullom | G01T 1/36 |
| 2019/0257773 | A1 | * | 8/2019 | Murray | G01N 33/12 |
| 2020/0155088 | A1 | * | 5/2020 | Gruener | A61B 6/485 |

FOREIGN PATENT DOCUMENTS

| | | |
|---|---|---|
| CN | 106383135 | 2/2017 |
| JP | 2003-14894 | 1/2003 |
| JP | 2006-126150 | 5/2006 |
| JP | 2015-78835 | 4/2015 |
| WO | WO 2011/002037 | 1/2011 |

OTHER PUBLICATIONS

Peter J. Statham ("Deconvolution and Background Subtraction by Least-Squares Fitting with Prefiltering of Spectra", Analytical Chemistry, vol. 49, No. 14, Dec. 1977 , pp. 2149-2154) (Year: 1977).*
Haugh et a. ("Quantitative Measurements of X-Ray Intensity", IntechOpen, 2011, pp. 229-260) (Year: 2011).*
Guthrie et al. ("Overview of X-Ray Fluorescence", University of Missouri, 2012, pp. 1-8) (Year: 2012).*
M. Santibanez et al: "TXRF quantification of interfering heavy metals using deconvolution, cross-correlation, and external standard calibration Deconvolution of heavy metals in TXRF spectroscopy", X-Ray Spectrometry, vol. 42, No. 6, Jul. 9, 2013 (Jul. 9, 2013), pp. 442-449, XP055439454, GB ISSN: 0049-8246, DOI: 10.1002/xrs.2501 * abstract * * p. 442, left-hand column paragraph 2 * * p. 443, left-hand column paragraph 3-p. 447, right-hand column paragraph 1 * * figures 1,3 *.
Piet van Espen: 11 Chapter 4: Spectrum evaluation In: "Handbook of X-ray Spectrometry", Dec. 31, 2002 (Dec. 31, 2002), XP009502676, ISBN: 0-8247-0600-5 pp. 239-340.
Adams F Ed—Braucher Regis et al: "Synchrotron radiation micro-X-ray fluorescence analysis: A tool to increase accuracy in microscopic analysis", Nuclear Instruments & Methods in Physics Research. Section B: Beam Interactions With Materials and A, Elsevier BV, NL, vol. 199, Jan. 1, 2003 (Jan. 1, 2003), pp. 375-381, XP004403258, ISSN: 0168-583X, DOI: 10.1016/S0168-583X(02)01563-X * abstract * * p. 376, left-hand column, paragraph 2-p. 377, right-hand column, paragraph 1*.

* cited by examiner

ANALYSIS OF X-RAY SPECTRA USING FITTING

CROSS-REFERENCE TO RELATED PATENT APPLICATIONS

The present application claims priority under 35 U.S.C. § 119 to European Patent Application No. 17181512.9, filed Jul. 14, 2017, which is hereby incorporated by reference in its entirety.

FIELD OF INVENTION

The invention relates to a method of analysis of X-ray spectra such as those obtained by X-ray fluorescence and to related apparatus and computer program products.

BACKGROUND TO THE INVENTION

When measurements are made of X-ray spectra, in particular X-ray fluorescence spectra, the measured spectra are influenced by a number of factors, for example the instrument function.

In order to obtain a quantitative analysis of a sample, it is necessary to provide an accurate quantitative measurement of the X-ray intensity in an energy dispersive measurement. Typically, the peak net area is required, i.e. the net area of the relevant peak after contributions from a variety of characteristic features are taken into account.

Such characteristic features which may be present in spectra are: peaks of characteristic lines originating from the sample, diffraction peaks; Raman peaks; spectral contamination from tube materials; scattered tube characteristic L lines; fluorescence of detector materials, effects caused by the degradation of the detector over time, and others.

One way of dealing with this variety of effects is to use spectral deconvolution using analytic functions. The theory is well known and reported, for example in the Handbook of X-ray spectroscopy, Rene Van Grieken and A. Markowicz CRC Press, second edition (2001) chapter 4. The method uses deconvolution, which is a fitting procedure which uses a non-linear least squares fit to the measured data. Such a deconvolution process uses a fitting model and a minimisation routine.

In the case of a typical energy dispersive spectrum, the fitting model is a sum of detector responses from each and every photon emitted from the sample, so building an accurate model requires detailed knowledge of the intensities of emitted fluorescent and scattered photons, as well as knowledge of the detection chain including the detector and processing electronics.

In real life, such detailed knowledge may not be available—the analyst may encounter a variety of spectra which exhibit features of unknown physical origin, features which although understood are not included in a model, or features that are not adequately described by existing models. Accordingly, spectral deconvolution using analytical functions may in some cases give insufficiently accurate results.

SUMMARY OF THE INVENTION

In a first aspect of the invention, there is provided a method of analysis of X-ray spectra in an instrument, comprising:

measuring a reference spectrum as a plurality of measured values $R_{pr}(i)$ for a plurality of energy bins i from at least one reference sample;

selecting $n_{pr}$ region or regions of interest indexed by j corresponding to a plurality of bins i and recording the profile $R_{pr}^{j}(i)$ for the respective plurality of bins from the measured reference spectrum, where $n_{pr}$ is a positive integer;

measuring a sample spectrum as a plurality of intensity values $R_{spe}(i)$ for a plurality of energy bins i;

fitting the measured sample spectrum $R_{spe}(i)$ to a fit function including the at least one profile $R_{pr}^{j}(i)$ in at least one respective region of interest as well as at least one calculated function $R_{gr}^{j}(i)$;

wherein:

the fit function includes a term $\Sigma_{j=1}^{n_{gr}} R_{gr}^{j}(i)$ and a term $\Sigma_{j=1}^{n_{pr}} P_{pr}^{j}(i) \cdot R_{pr}^{j}(-i_s)$;

there are an integer $n_{gr}$ calculated functions and respective line groups;

$R_{gr}^{j}(i)$ represents the $j^{th}$ calculated function which is a response value of a line group j;

there are $n_{pr}$ profiles each in a respective region of interest;

$R_{pr}^{j}(-i_s)$ represents the $j^{th}$ profile;

$P_{pr}^{j}(i)$ is a profile modifying function for the $j^{th}$ profile; and $i_s$ is a shift parameter for the profiles.

In embodiments, the fit function may be:

$$R_{spe}(i) = \sum_{j=1}^{n_{gr}} R_{gr}^{j}(i) + \sum_{j=1}^{n_{pr}} P_{pr}^{j}(i) \cdot R_{pr}^{j}(i - i_s) + \sum_{j=1}^{n} P_j(i)$$

wherein $R_{spe}(i)$ is the measured sample spectrum; and $\Sigma_{j=1}^{n} P_j(i)$ is the sum of n functions $P_j(i)$ representing additional physical effects, where n is an integer.

The fitting step fits the parameter or parameters of the profile modifying function as well as the parameter or parameters of the calculated function and any fitting parameters present in the n functions $P_j(i)$ representing additional physical effects, and or the shift parameter $i_s$.

In some cases, one or other of the functions $P_j(i)$ representing additional physical effects, and/or the shift parameter $i_s$ may be omitted, equivalent to taking $P_j(i)=0$ or $i_s=0$ respectively. Thus, in the case where $P_j(i)=0$ the fit function reduces to:

$$R_{spe}(i)\Sigma_{j=1}^{n_{gr}} R_{gr}^{j}(i) + \Sigma_{j=1}^{n_{pr}} P_{pr}^{j}(i) \cdot R_{pr}^{j}(i-i_s).$$

By fitting to a sum of measured profiles (represented by $R_{pr}^{j}(i)$ and response values of line groups, which may be represented by $R_{gr}^{j}(i)$, the fit can accurately represent parts of the spectrum not accurately represented by calculated functions.

The region of interest of the profile $R_{pr}^{j}(i)$ is a range of values of energy, i.e. a range of values i for which the profile has non-zero values. For values of i outside the region of interest the profile has a value zero.

In one example, a single profile ($n_{pr}=1$) corrresponding to the complete range of measured values is used.

In other examples, profiles in a specific range of values of i and hence in a particular energy/wavelength range are represented, which allows the representation of measured features in a particular energy range.

In some examples, a single profile ($n_{pr}=1$) corrresponding to a particular range of values of i and hence a particular range of energies/wavelengths is measured. This allows the reference spectrum to be used in a particular energy range, for example an energy range where the at least one calculated function does not give accurate results.

In some examples, plural profiles ($n_{pr}>1$) are used—the different profiles may represent different ranges of energy corresponding to different features, and may optionally overlap.

In the simplest case the profile modifying function is a polynomial of $0^{th}$ degree which reduces the profile modifying function to a simple scale factor and a single fitting parameter. Alternatively, other functions can be used such as a first or second order polynomial in which case there will be two or three fitting parameters in the profile modifying function respectively.

In the case that the modifying function $P_{pr}^{j}(i)$ is a polynomial, the multiplication of the profile by the polynomial can have a broadening or tilt effect on the profile to account either for resolution changes of the profile from the time of measurement to the time of application, or for the effects of a tilted background profile.

Alternatively, for greater simplicity, the modifying function $P_{pr}^{j}(i)$ may simply be a constant scale factor.

In order to obtain the reference spectrum and hence the profile, the sample may be measured in the instrument concerned preferably under as similar conditions as possible to the conditions used for measuring the sample spectra. A plurality of samples may be measured to produce a plurality of reference spectra and the sum or average of the measured intensity values in each region of interest (i.e. for the set of energy bins) may be used as the respective profile $R_{pr}^{j}(i)$.

The plurality of samples may contain a plurality of different concentrations of components of interest. In particular, a range of samples with different concentrations of a number of elements of interest may be provided as reference samples, and by averaging out the intensity from the different samples, a profile for the range of concentrations may be obtained.

The use of the final term of the above equation is optional and accordingly, in embodiments, the function $\Sigma_{j=1}^{n}P_{j}(i)$ is taken as zero. In an alternative embodiment the function $\Sigma_{j=1}^{n}P_{j}(i)$ may be a polynomial.

BRIEF DESCRIPTION OF THE DRAWINGS

For a better understanding of the invention, the invention will now be described purely by way of example, with reference to the accompanying drawings in which.

DETAILED DESCRIPTION

For a better understanding specific embodiments will now be described, purely by way of example.

Figure 15:
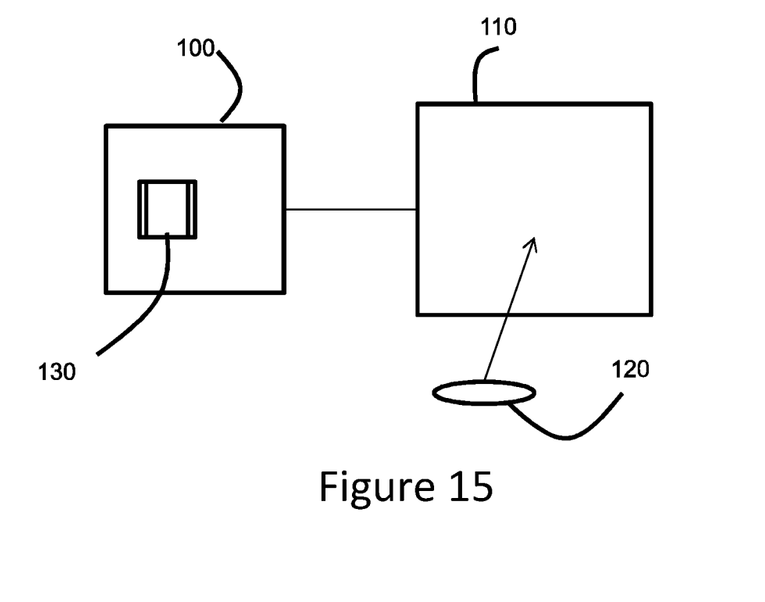
FIG. 15 is a highly schematic representation of an embodiment of an apparatus.

Referring to FIG. 15, an embodiment includes XRF measurement apparatus 110 into which a sample or samples 120 may be inserted for measurement. The XRF measurement apparatus is connected to a controller 100 which contains a computer program product 130 for controlling the controller 100 and in turn measurement apparatus 120. The XRF measurement apparatus 110 in this embodiment is commercially available XRF measurement apparatus and so will not be described further.

It should be noted that FIG. 15 is highly schematic and the controller 110 may be, for example within the casing of the measurement apparatus 100. The computer program product 130 may include multiple separate programs. Further, those skilled in the art will realise that the controller 100 may include one or more processors, data storage, and networks.

Embodiments fit to measured data not just using the deconvolution approach but also by using simultaneously at least one measured profile, which may be the profile of all or part of the spectrum.

In a first step (10) (see FIG. 1), at least one reference sample is placed in measurement apparatus and a spectrum is measured. The reference sample may be for example a standard sample or simply a reference sample similar to that of the sample to be measured. The intensity values are recorded as a function of energy, in a number of contiguous energy bands, creating a spectrum of measured intensity values over a plurality of bins, each bin corresponding to an energy range.

Figure 1:
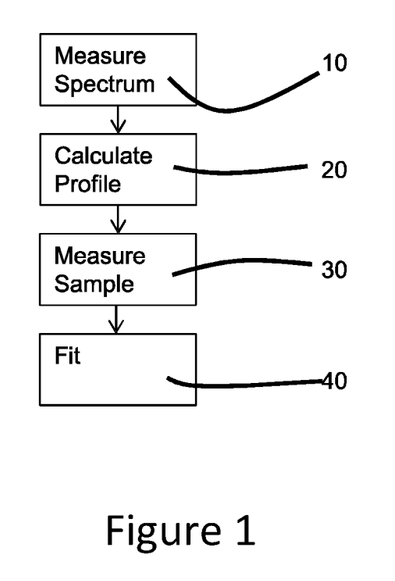
FIG. 1 is a flow diagram of an embodiment of a method according to the invention.

In an example, a single blank standard can be measured. In other examples, multiple standards can be measured.

In a second step (20), a profile is calculated from the measured data. Each profile is a set of measured values $R_{pr}(i)$ for energy bins i within a respective region of interest, ROI. In the case where only a single spectrum is measured, over the full measurement range, the profile can simply be a smoothed version of the measured spectrum and the region of interest can be the whole measured spectrum. In this case the profile may have non-zero values for all energy bins.

In cases where other measurements are taken to measure effects in particular energy ranges, then the region of interest will be the region of that particular effect and the profile $R_{pr}(i)$ will have non-zero values only for values of i within the respective ROI.

In a third step (30), a sample to be measured is introduced into the instrument. The spectrum is measured and recorded as a plurality of intensity values $R_{spe}(i)$ for a plurality of energy bins i.

Next, a fit is carried out (40). The measured spectrum $R_{spe}(i)$ is fit to a combination of calculated functions, as in the conventional deconvolution method, together with the measured profiles in the respective region of interest, and optionally one or more further functions $P_n(i)$ which represent other effects that may be fitted.

This may be expressed mathematically as fitting the spectrum $R_{spe}(i)$ as follows:

$$R_{spe}(i)=\Sigma_{j=1}^{n_{gr}}R_{gr}^{j}(i)+\Sigma_{j=1}^{n_{pr}}P_{pr}^{j}(i) \cdot R_{pr}^{j}(i-i_s)+\Sigma_{j=1}^{n}P_j(i) \quad (1)$$

wherein $R_{spe}(i)$ is the measured spectrum;
$R_{gr}^{j}(i)$ represents at least one calculated function which is a response value of a line group j, wherein the number of calculated functions and respective line groups is an integer $n_{gr}$;
there are $n_{pr}$ profiles each in a respective region of interest;
$R_{pr}^{j}(i-i_s)$ represents the $j^{th}$ profile;
$P_{pr}^{j}(i)$ is a profile modifying function for the $j^{th}$ profile;
$i_s$ is a shift parameter for the profiles; and
$\Sigma_{j=1}^{n}P_j(i)$ is the sum of n functions $P_j(i)$ representing additional physical effects, where n is an integer.

The calculated functions are obtained and fitted using a conventional deconvolution approach with constraints. Examples of this approach are provided in the previously mentioned Handbook of X-ray Spectrometry and so this aspect will not be described further.

Note that the profiles are not simply subtracted from the measurements before fitting. Instead, the profiles are used integrally in the fitting process. The values of the parameters of the profile modifying functions $P_{pr}^{j}(i)$ the calculated functions $R_{gr}^{j}(i)$, and the functions $P_j(i)$ representing additional physical effects are all fitted in the step of carrying out a fit.

Note that although in general additional physical effects are represented by functions $P_j(i)$, in the simplest case there are no such functions (n=0). In this case the fit is to the fit function:

$$R_{spe}(i)\Sigma_{j=1}^{n_{gr}}R_{gr}^{j}(i)+\Sigma_{j=1}^{n_{pr}}P_{pr}^{j}(i) \cdot R_{pr}^{j}(i-i_s) \quad (2)$$

Further, the use of the shift parameter $i_s$ is also optional—the shift parameter takes into account drifts in the measured energy bins. If the reproducibility of data in energy is sufficiently good, the shift parameter may be omitted (mathematically $i_s$=0).

The method delivers significant advantages compared with the methods presented in the Handbook of X-ray Spectrometry. No assumptions need to be made in the profiles—they are simply measured. For this reason, even physical processes that cannot be easily modelled can be taken into account and compensated to a large extent.

Further, contributions from spectral contaminations from non-sample related fluorescent or scattering processes are automatically removed from the deconvoluted spectra.

Where one of the profiles corresponds to a blank sample, this may serve as a reference monitor spectrum which can take account of tube or detector degradation, for example caused by deposits of C or W on the anode or effects due to radiation damage. Such effects are particularly prevalent in on-line measurements in which apparatus is in continuous use.

The method is of particular application to the measurement of trace elements, such as contaminants in plastics, traces in oil, pharmaceutical or air filter analysis.

In embodiments, a blank sample may be incorporated into apparatus, for example in a sample holder, to allow the measured profiles to be remeasured on a regular basis, for example daily or hourly.

The measurement works optimally in vacuum, since it does not take into account fluctuations in air pressure.

Note that one or more profile modifying model functions $P_{pr}$ may be included, for example a polynomial:

$$P_{pr}=\alpha_0+\alpha_1(i-i_0)+\alpha_2(i-i_0)^2+ \quad (3)$$

in which $i_o$ is an offset which may be treated as a fitting parameter; the coefficients a may also be treated as fitting parameters. Such a profile modifying function in the form of a polynomial can have a moderate effect on the widths of the peaks and may correct a profile for resolution changes—if the profile in use was measured at an earlier time but the resolution has deteriorated, it is possible to correct for this change using such a modifying polynomial.

The method described here may account for ratio changes between two line peaks. In an example, when using a profile with a particular ratio of the Ka and Kb lines, for example Fe, it may be that the measured ratio of the Ka and Kb lines in the sample does not match the profile. In this case, theoretical model functions (calculated functions $R_{gr}^{j}(i)$) may be introduced for the Fe Ka and the Fe Kb lines. If the Kb line is too strong after scaling the profile for the Ka line, a negative value for the calculated function will allow the calculated value of the theoretical model of the Kb line to become negative and so compensate for the too-strong Kb line after the profile is scaled.

In summary, in a preferred embodiment, the following details are adopted.

During the step (10) the sample that is measured is preferably a properly defined standard i.e. a standard of known repeatable material. Such standards are commercially available.

The measurement time in this step may be adjusted as long as required to obtain a significant reduction in measurement uncertainty in each of the energy bins. Alternatively or additionally, during the step (20) of obtaining at least one profile the measured spectrum may be carefully smoothed. A calculated background may be also subtracted. This step may be automated. The result may be checked for distortions.

After the sample to be measured is measured (step (30)), then the measured data is fit (step (40)) to both the calculated functions $R_{gr}^{j}(i)$ as well as the measured profiles $R_{pr}^{j}(i)$.

In terms of physical effects represented by the functions $P_j(i)$, these can represent a variety of additional effects that may need to be taken into account, for example additional atomic or nuclear effects such as Bremsstrahlung or Resonant Raman Scattering.

Take, for example, the case of resonant Raman scattering. This effect becomes visible in a spectrum when the energy of a characteristic line is very close to but lower in energy than an absorption edge (e.g. K) of another element. In this case, a tailed distribution is introduced in the fitting model calculated from a doubly differential scattering cross section a as a that can be described using the following formula:

$$\frac{d^2\sigma_{rrs}}{d\Omega dE_s}=C(E_0)\frac{(U_K+T_e)(U_K-U_L)}{(U_K-U_L-E_S)^2+\left(\frac{\Gamma_K}{2}\right)^2} \quad (4)$$

where $E_0$ is the energy of the incoming photon, $C(E_0)$ is a constant that depends on $E_0$, $E_s$ is the energy of the scattered photon (energy at a bin), $U_K$ is the absorption energy of the element, $U_L$ is the energy of the L absorption edge of the element and $\Gamma_K$ is the natural width of the K absorption edge of the element. To obtain the value of the fitting function $P_j$ from the cross section a, the formula must be integrated over energy within the width of a bin and convoluted with the detector's resolution. The $U_L$ can be allowed to vary as shift parameter and $C(E_0)$ as the scaling factor during the deconvolution.

Another example of a physical effect is in sample induced photoelectron Bremstrahlung background. This can be calculated from a modified form of the original Kramer's formula:

$$P_j = K \frac{E_0 - E_i}{E_i} \quad (5)$$

where K can be a fitted parameter $E_0$ can be either a constant energy or a fitted parameter and $E_i$ is the energy at a bin with bin number i.

A further example of a function $P_j$ that may be used is an analytic function, generally a polynomial, to fit to the results of a physical effect which has been modelled by means of a detailed Monte Carlo simulation. Another example can be a theoretically calculated response of a Monte Carlo simulation. For example, when measuring oil samples, the scattered profile of the primary excitation spectrum by the dark organic radiation may be calculated by such a Monte Carlo simulation.

Note that although many fitting algorithms use Gaussian functions for the functions $R_{gr}^j(i)$ other functions may be used, including in particular Exponential tail functions. Other examples include Shelf functions, Voigt functions, and Hypermet functions, the last being linear combinations of Gaussian or Voigt main peaks with exponential tail and shelf functions. These functions are described in the Handbook of X-Ray Spectroscopy referenced above.

Those skilled in the art may also use Lorentzian functions, generally together with Exponential tail or shelf functions, Pseudo Voigt functions, for faster implementation than Voigt functions, Pearson VII functions, or split functions to account for asymmetries. Such functions are known for XRF fitting, or in the case of Pearson or Split functions, for XRD fitting.

EXAMPLES

In the example first presented below, a single profile was used, corresponding to a blank sample.

In this case, a commercial collection of reference samples was used, namely the "ADPOL" collection from Panalytical BV. This is a set of reference samples in the form of polyethylene discs containing the following elements: F, Na, Mg, Al, Si, P, S, Ca, Ti and Zn. There are four samples with varying amounts of these elements to act as standards as well as four blank standards without.

The samples were measured using a Ag tube at 9 kV, 600 μA, using a Ti filter and a silicon nitride window silicon drift detector in a Panalytical E3 X-ray fluorescence analysis apparatus.

This example was chosen because a number of difficulties are presented by such samples using conventional methods.

These difficulties include the fact that the signals for Al, Mg and Si are strongly influenced by the overlapping escape contributions of the scattered Ag lines. Consequentially, an accurate determination of these escape contributions requires an accurate deconvolution of the scattered tube lines. Such an accurate deconvolution is not straightforward since it requires complex "Fundamental Parameters (FP)" based model modifications to account for changes in the atomic line ratios of scattered lines.

Secondly, the fluorescence peaks from P and S are positioned closely to the tail of the Ag L lines and are affected by a wide structure, which may be the result of diffraction effects. Any mathematical definition of the background therefore may result in a calculated component that differs substantially from the underlying component when carrying out measurements.

Figure 2:
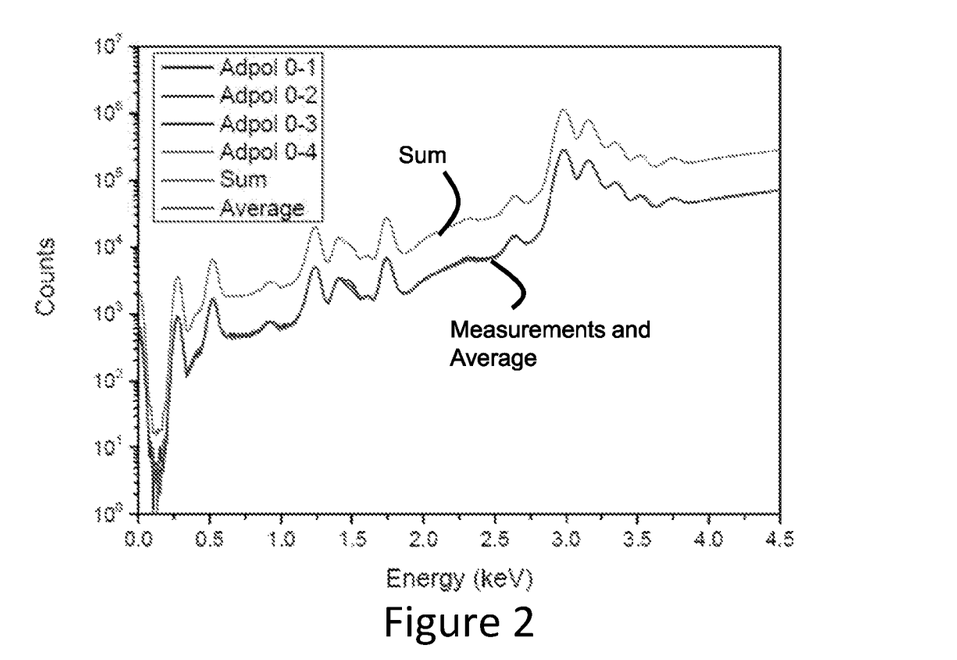
FIG. 2 illustrates measurements on blank samples.

FIG. 2 illustrates measured spectra from each of four blank (nominally identical) ADPOL standards as well as the sum and average. In order to obtain a measured profile from these measured spectra, the sum of the four measurements was smoothed. In this example, the region of interest is the whole of the region of fit and the whole of the energy range shown (up to 4.5 keV) and there is only a single profile used. Note that the line labelled "measurements and average" is in fact five plots of the same data (each of the four blank samples and their average) but the differences between these lines are too small to see on this graph.

Figure 3:
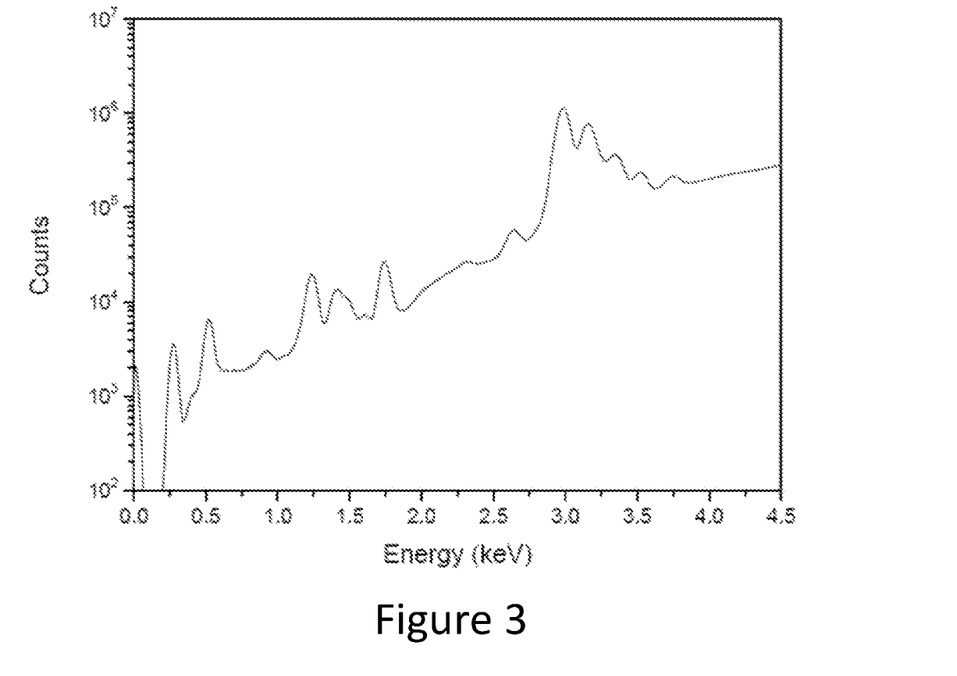
FIG. 3 illustrates an example profile obtained from the measurements of FIG. 2.

FIG. 3 illustrates the profile obtained by smoothing the summed spectrum, used in the following examples.

Then, one of the non-blank standards in the commercial ADPOL standard collection was measured. This was then processed in two ways.

Figure 4:
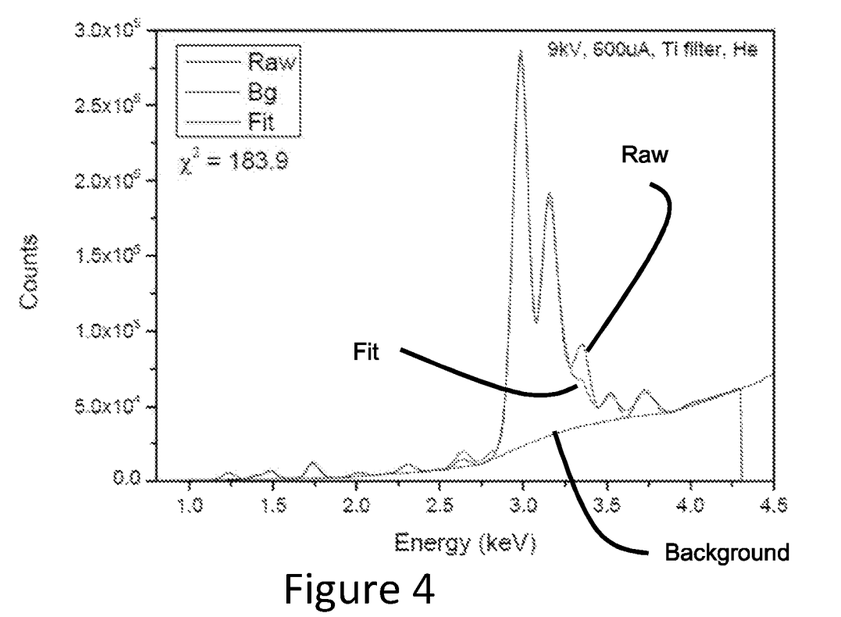
FIG. 4 illustrates a fit according to a comparative example.

By way of a comparative example, a conventional deconvolution approach was used. FIG. 4 illustrates the raw data, a background correction and the fit using a conventional deconvolution approach. Note that the data is presented as a linear graph not a log graph which explains the difference to FIG. 3.

Although the conventional method does give reasonable results, in some cases there are significant differences between the fit lines and the raw data which indicates strong deviations and a poor fit—see especially the deviation about 3.4 keV. This means that the fit parameters cannot be treated as wholly reliable. The $\chi^2$ value of 183.9 indicates a poor fit.

Figure 5:
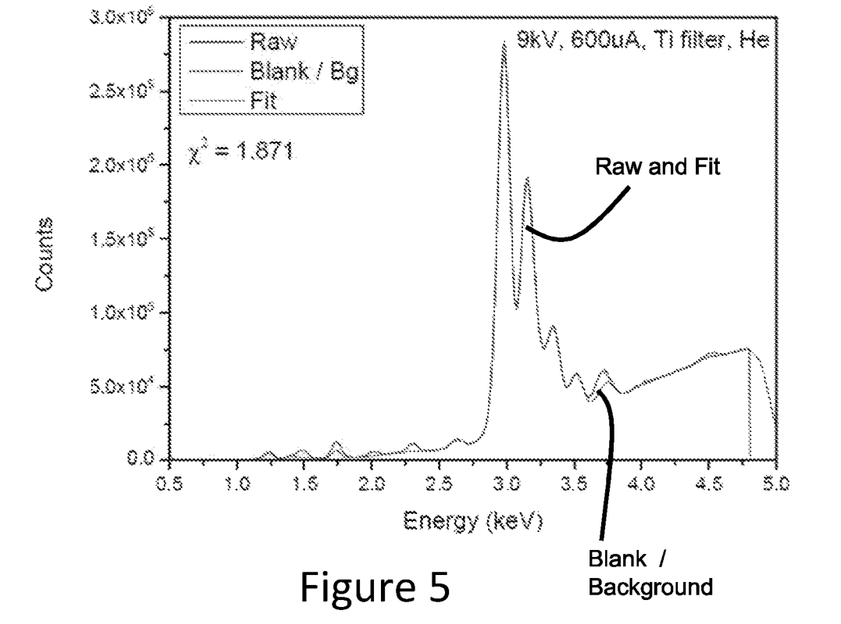
FIG. 5 illustrates a fit using a method according to an embodiment using the same data as the comparative example in FIG. 4.

Then, a fit using the profile of FIG. 3 as the single profile in equation (1) was carried out and the results presented in FIG. 5. This profile is the blank spectrum over the whole measured energy range as the region of interest.

In this example, a single profile $R_{pr}$ is combined with Gaussian functions $R_{gr}$ the latter describing the effect of the response of characteristic lines, i.e. the fit uses the first two terms of equation (1) above. Even with only a single profile (obtained from measurement) combined with Gaussian functions (obtained by calculation), the results are much better than using Gaussians alone.

FIG. 5 shows the fitted blank background spectrum in this case with one profile ($n_{pr}=1$) the term $\Sigma_{j=1}^{n_{pr}} P_{pr}^j(i) \cdot R_{pr}^j(-i_s)$ of equation (1) reduces to $P_{pr}(i) \cdot R_{pr}(i-i_s)$. FIG. 1 also shows the raw (measured) data and the fit data which align so exactly that the lines cannot be distinguished at the scale of the graph. In this case, fit is much better, indicated by a $\chi^2$ value is 1.871, almost two orders of magnitude better than the comparative example.

Note further that the method of the invention in which the measured spectrum is included in the fit as a profile is much better than subtracting a blank spectrum and then just fitting the remainder using the conventional deconvolution approach as in the comparative example of FIG. 4 (negative values are avoided in the fit). Even in this example with only a single profile over the whole of the measured spectrum it will be noted that the fit to the measured spectrum is much better and there are fewer unexplained deviations.

Figure 6:
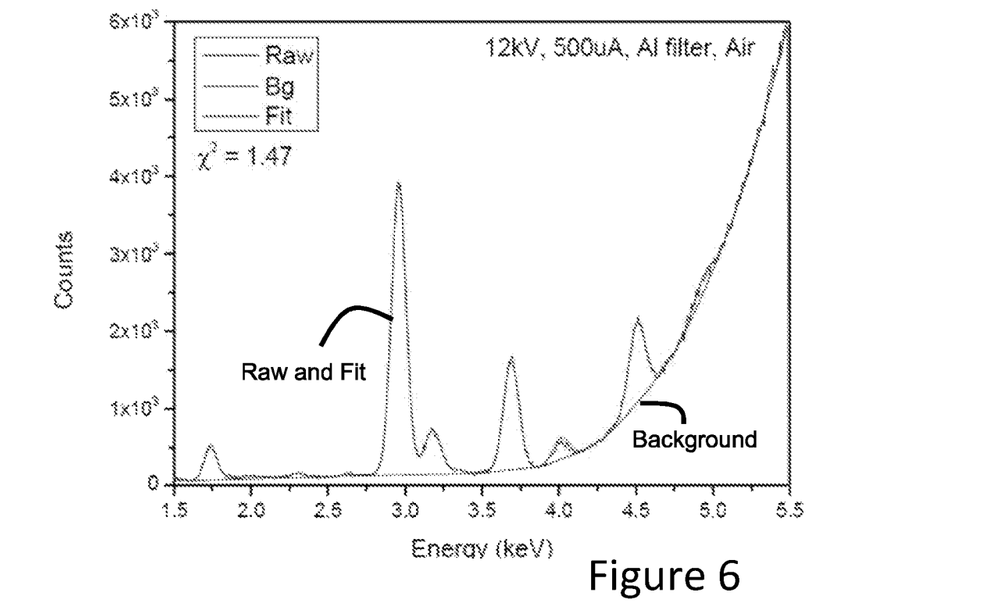
FIG. 6 illustrates a fit according to a comparative example.
Figure 7:
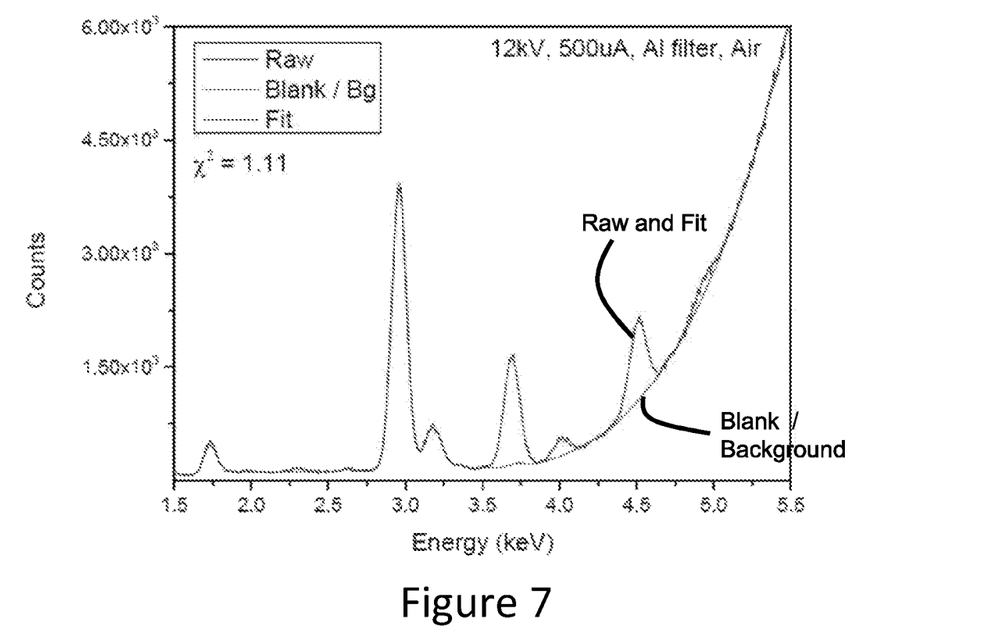
FIG. 7 illustrates a fit using a method according to an embodiment using the same data as the comparative example in FIG. 6.

Good results were obtained with other conditions. The above experiments were repeated using 12 kV X-rays, 500 using an Al filter in the same apparatus. FIG. 6 illustrates the fit using a comparative example and FIG. 7 an embodiment of the invention, the same method as discussed above with reference to FIG. 5. Again, the invention gives better results, though in this case the improvement in $\chi^2$ is less, from 1.47 in the comparative example to 1.11 using the method of the invention. This is expected as in this example the existing method already produces a reasonable fit, though not as good as that using the invention.

Figure 8:
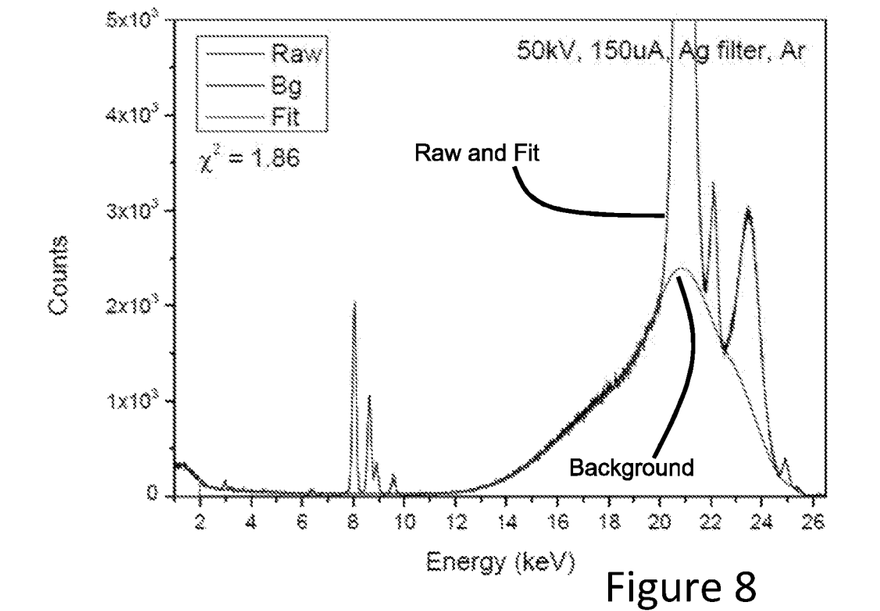
FIG. 8 illustrates a fit according to a comparative example.
Figure 9:
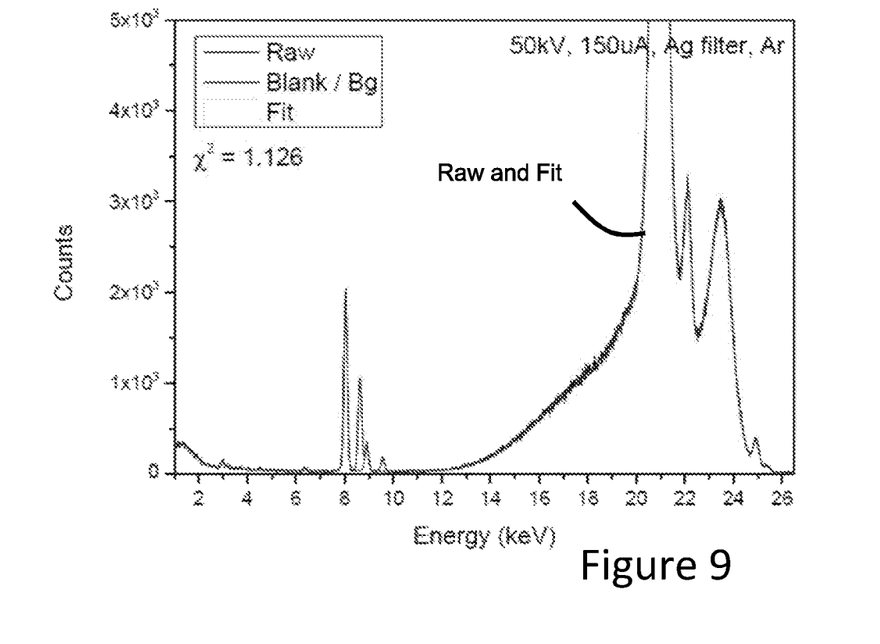
FIG. 9 illustrates a fit using a method according to an embodiment using the same data as the comparative example in FIG. 8.

A further example was then tested, using 50 kV, 200 μA and an Ag filter, with the comparative example presented in FIG. 8 and that using a method according to the invention in FIG. 9. In this case, the $\chi^2$ value improves from 1.86 to 1.126 using the method of the invention.

The above examples show that even using only a single profile good results can be obtained.

The method is also applicable to situations where more than one profile gives improved results. This applies in particular where only part of the spectral response has an important effect on the quality of the fit, and therefore a calculated response may be replaced with the measured profile in the region of interest to provide improved results.

A specific example will now be described which relates to measurements of a coating of a pill containing significant quantities of Ti. The organic coating gives a number of peaks—in addition the Ti gives a pair of peaks at approximately 4.5 and 4.95 keV.

Figure 10:
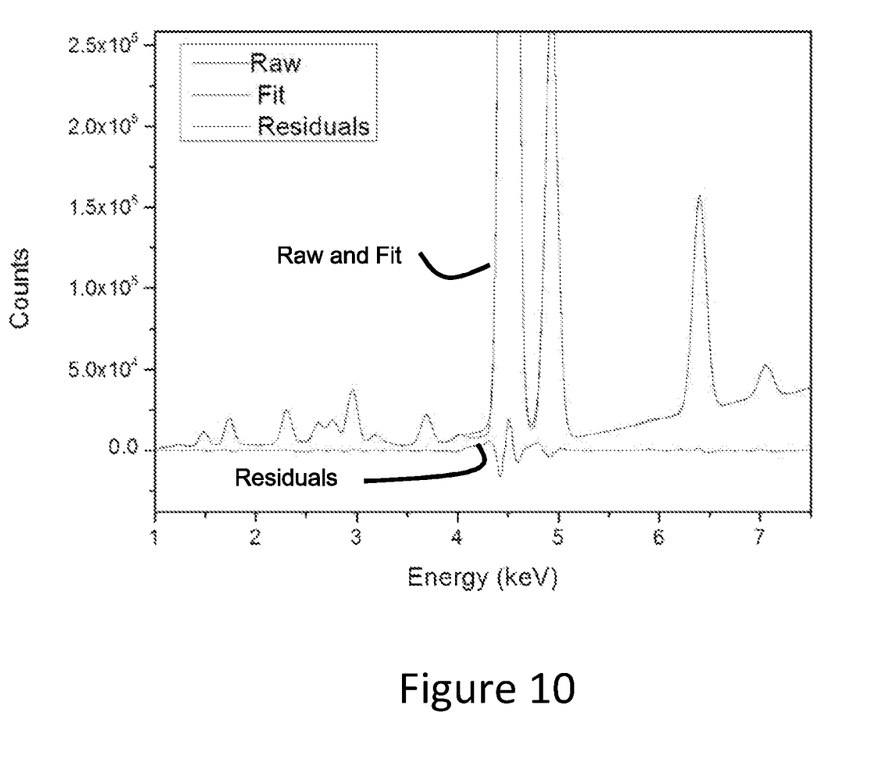
FIG. 10 illustrates measurements on a different sample, and the fit using a comparative example.

FIG. 10 shows the measured spectrum (with a standard background removed), a fit using a standard background algorithm (i.e. a calculated spectrum based on the presence of a number of components, including Ti), and the residuals. At the scale of the graph the discrepancy between the raw and the fit lines is not easy to see, though it is visible at around 4.3 keV. Instead, the graph of the residuals shows the discrepancy more clearly. The fit gives a concentration of Ti. However, there is significant deviation from the fit in the region of the peaks between about 4 keV and 5 keV—especially note the deviation just above 4 KeV—demonstrating that the fit is poor in exactly the region of interest, i.e. the Ti peaks. The value of $\chi^2$ for this fit is 70. The poor fit leads to a lack of confidence in the concentration of Ti and possible V peaks of that are overlapping with Ti peaks.

Figure 11:
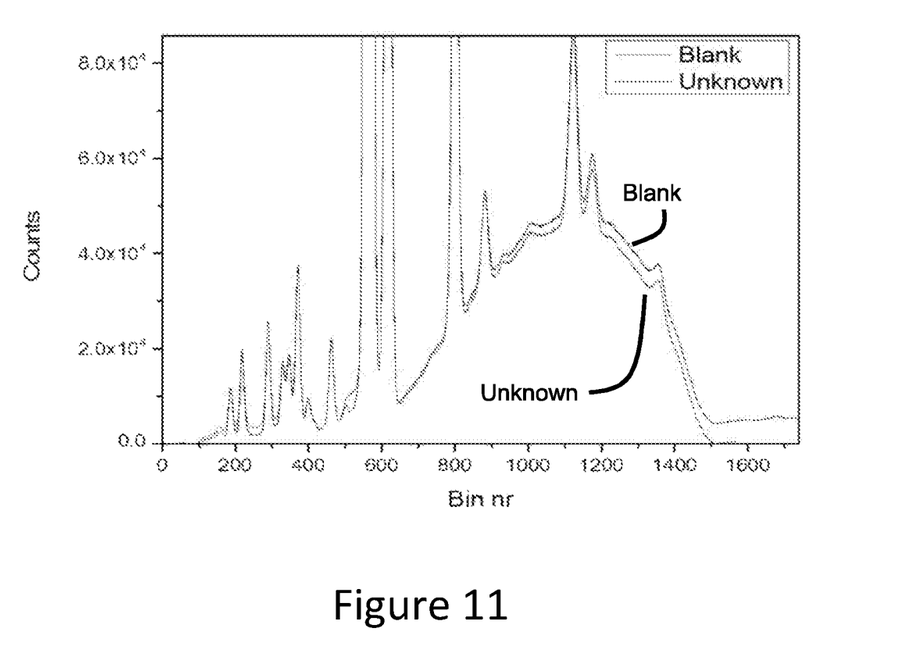
FIG. 11 illustrates the difference between measured data and the fit using a comparative example.

FIG. 11 illustrates the reason for this—the raw measured data (labelled unknown) does not exactly resemble the calculated data (labelled blank). The exact shape of the Ti peak as measured does not match the calculated data. Note that in FIG. 11 the graph has an x-axis corresponding to bins, not energy—the energy range 4 to 5 keV corresponds to bins 480 to 650.

Figure 12:
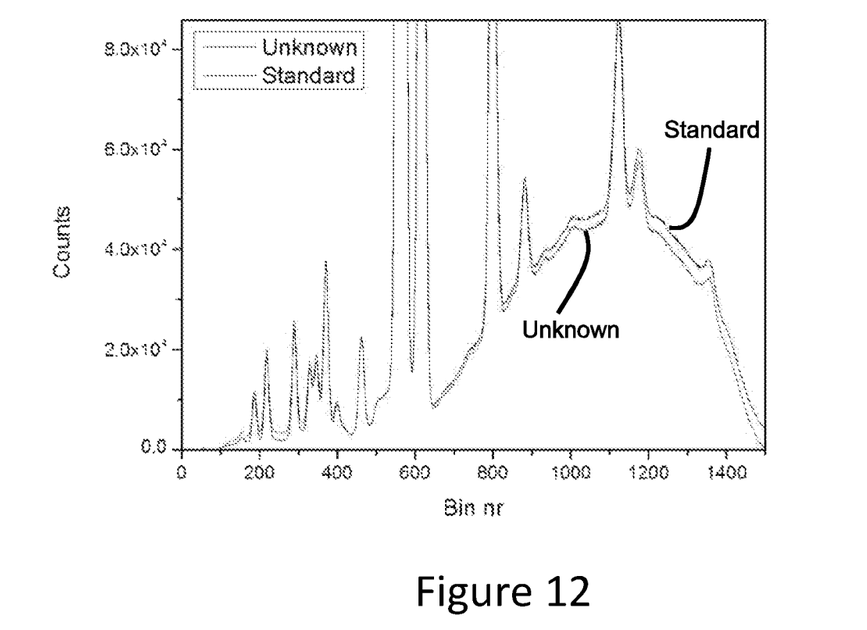
FIG. 12 illustrates the difference between the same measured data and a fit using a method according to an embodiment.

However, if the raw measured data (labelled unknown) is compared with measured data from a measured standard (labelled standard) then the line fit in the range 4 to 5 keV, corresponding to bins 480 to 650, is very good. See FIG. 12.

Figure 13:
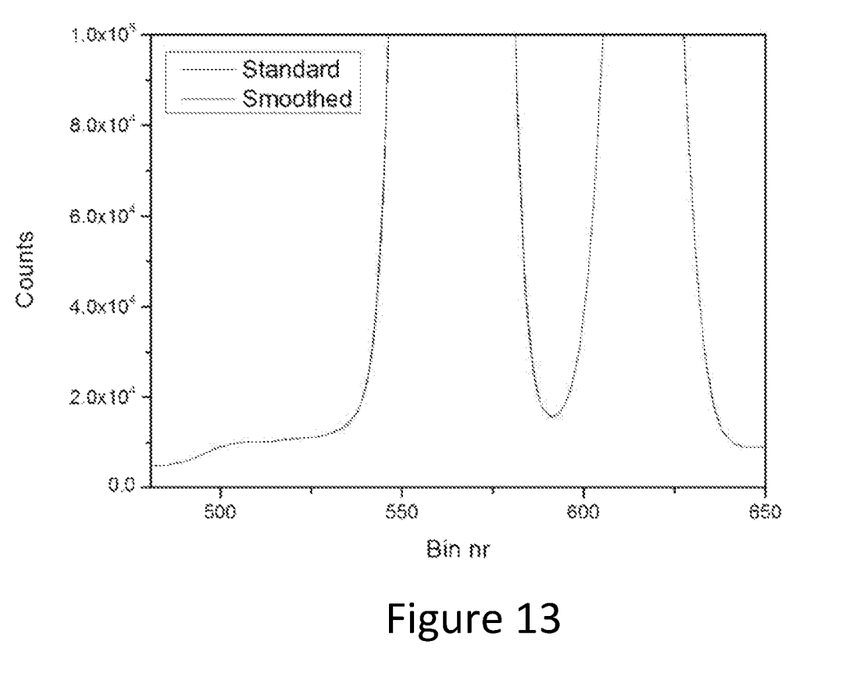
FIG. 13 illustrates smoothed measured data used in the method illustrated in FIG. 12.

Therefore, in a method according to an embodiment, in order to correctly fit to the measured spectrum (unknown) a smoothed version of the measured standard is used as the profile in a region of interest that is, in this example, not the whole of the measured range but in this case the region of interest is the range of bins 480 to 650 (approximately 3.8 to 5.2 keV)—corresponding to the two Ti peaks. This smoothed measured spectrum used as a profile is illustrated in FIG. 13.

This profile is used instead of the calculated values from the standard background algorithm and Ti peak functions within this energy range (bins 480 to 650) to fit to the original unknown spectrum. Outside this energy range, the original fitting algorithm is used, i.e. outside the range of bins from 480 to 650, the fit is to a calculated function.

Figure 14:
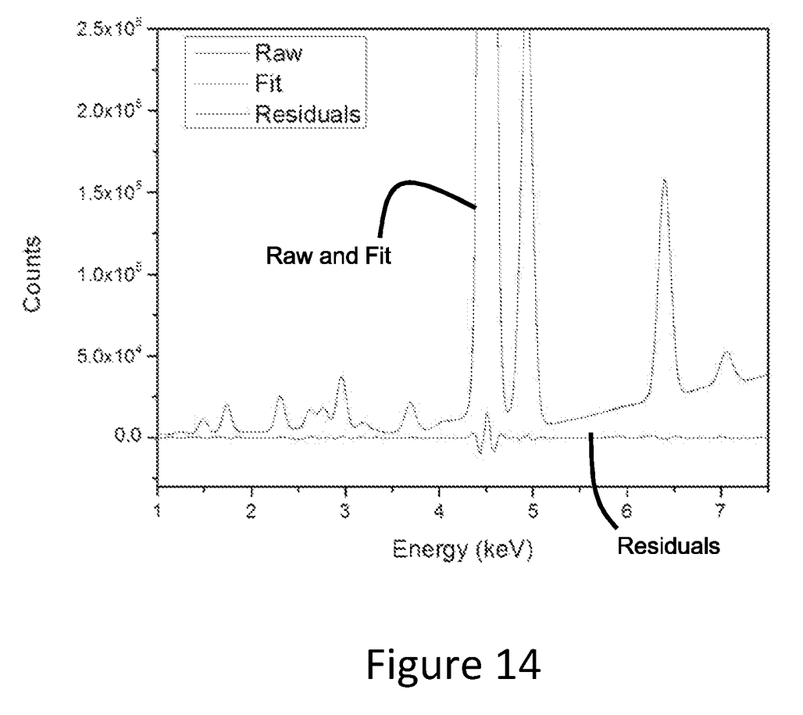
FIG. 14 corresponds to FIG. 10 but using the method illustrated in FIGS. 12 and 13.

The results are illustrated in FIG. 14, which shows the same data (Raw) as in FIG. 10. Note that the size of the residuals is less—in this case the $\chi^2$ value is approximately 12, compared with 70 in FIG. 10, indicating a much better fit and hence more reliable estimates of the concentration of Ti in the coating.

In addition if a signal of V is hidden under the Ti-Kb peak and since minimization is not selective, non-fitted parts of the spectrum will influence the results obtained for this element as well By using a measured spectrum, not a calculated spectrum in the range of the Ti peaks, such effects can be taken care of without requiring the user to be aware of the underlying mechanism.

Thus, referring to the general equation (1) above, only one line group is fitted using a profile, which is not offset, so $n_{pr}=1$, $P_{pr}^{j}(i)$ reduces to 1, and j only takes the value 1. Thus, the term $\Sigma_{j=1}^{n_{pr}} P_{pr}^{j}(i)$. $R_{pr}^{j}(-i_s)$ reduces to $R_{pr}^{1}(i)$ and is applied in the energy range from bins 480 to 650 corresponding roughly to 3.8 to 5.2 keV. This single profile corresponds to the Ti line group (the group of lines which are produced by Ti), The remaining composition of the organic coating is not represented by such a measured profile but by calculation. In this example, $n_{gr}=7$ and each term in the equation $\Sigma_{j=1}^{n_{gr}} R_{gr}^{j}(i)$, $R_{gr}^{1}(i)$ represents the lines of a single element, such as calcium, iron, etc. Each line of each line group, representing for example the peaks observed at 6.4 keV and 7 keV, as well as the peaks between 1.5 and 3.6 keV, is represented by a Gaussian.

The background in this example is precalculated. The precalculated background is added to the fitting model, so there is one additional function $P_j$ representing the background physical effect.

Thus, in this example the region of interest for the use of the measured reference spectrum is not the whole spectrum, as in the example of FIGS. 1 to 9, but only the energy range of bins 480 to 650 (corresponding to 3.8 keV to 5.2 keV).

By fitting the energy range of the Ti peaks using a measured spectrum, rather than fitting to calculated functions as used for the peaks of trace elements in the organic matrix spectrum, an improved fit can be obtained.

This approach is not limited to this measurement but may be used in a wide variety of scenarios. For example, this same method may be used in particular to the measurement of Al in low concentrations in a glass ($SiO_2$) matrix.

The invention claimed is:

1. A method of measuring one or more components in a measured sample in an instrument adapted to measure X-ray scattering, comprising:
   measuring, in the instrument, a reference spectrum as a plurality of measured values $R_{pr}(i)$ for a plurality of energy bins i from at least one reference sample;
   selecting, by a controller coupled to the instrument, $n_{gr}$ region or regions of interest from the measured reference spectrum indexed by j corresponding to a plurality of energy bins i and recording, in a data storage by the controller, a profile $R_{pr}^{j}(i)$ for the respective plurality of energy bins, where $n_{pr}$ is a positive integer;
   measuring, in the instrument, a sample spectrum from the measured sample as a plurality of intensity values $R_{spe}(i)$ for a plurality of energy bins i;
   fitting, by the controller, the measured sample spectrum $R_{spe}(i)$ to a fit function to obtain a fitted sample spectrum;

determining, by the controller, the one or more components in the measured sample based upon the fitted sample spectrum; and recording, in the data storage by the controller, the determined one or more components, wherein:

the fit function is:

$$R_{spe}(i) = \sum_{j=1}^{n_{gr}} R_{gr}^j(i) + \sum_{j=1}^{n_{pr}} P_{pr}^j(i) \cdot R_{pr}^j(i - i_s) + \sum_{j=1}^{n} P_j(i);$$

there are an integer $n_{gr}$ calculated functions and respective line groups;

$R_{gr}^j(i)$ represents the $j^{th}$ calculated function which is a response value of a line group j;

there are $n_{pr}$ profiles each in a respective region of interest;

$R_{pr}^j(i-i_s)$ represents the $j^{th}$ profile;

$P_{pr}^j(i)$ is a profile modifying function for the $j^{th}$ profile;

$i_s$ is a shift parameter for the profiles;

$R_{spe}(i)$ is the measured sample spectrum; and $\Sigma_{j=1}^{n} P_j(i)$ is the sum of n functions $P_j(i)$ representing additional physical effects modelled based on a Monte Carlo simulation, where n is an integer.

2. A method according to claim 1, wherein there is a single profile ($n_{pr}$=1) corresponding to the complete spectrum.

3. A method according to claim 1 comprising measuring the reference spectrum in a plurality of samples and taking as the plurality of measured intensity values of the profile a sum or average of the measurements of the reference spectrum of the plurality of samples.

4. A method according to claim 1 wherein the function $\Sigma_{j=1}^{n} P_j(i)$ is taken as zero.

5. A method according to claim 1 wherein at least one function $P_j(i)$ is a polynomial.

6. A method according to claim 1 wherein the profile modifying function $P_{pr}^j(i)$ is a polynomial.

7. A method according to claim 1 wherein the profile modifying function $P_{pr}^j(i)$ is a constant scale factor.

8. A computer program product embodied in a non-transitory computer-readable medium for measuring one or more components in a measured sample, the computer program product adapted when run on a computer connected to and controlling an instrument, which is adapted to measure X-ray scattering, to carry out the steps of:

measuring in the instrument a reference spectrum as a plurality of measured values $R_{pr}(i)$ for a plurality of energy bins i from at least one reference sample;

selecting, by the computer, $n_{pr}$ region or regions of interest from the measured reference spectrum indexed by j corresponding to a plurality of energy bins i and recording, in a data storage by the computer, the profile $R_{pr}^j(i)$ for the respective plurality of energy bins, where $n_{pr}$ is a positive integer;

measuring in the instrument a sample spectrum from the measured sample as a plurality of intensity values $R_{spe}(i)$ for a plurality of energy bins i;

fitting, by the computer, the measured sample spectrum $R_{spe}(i)$ to a fit function, to obtain a fitted sample spectrum;

determining, by the computer, the one or more components in the measured sample based upon the fitted sample spectrum; and recording, in the data storage by the computer, the determined one or more components, wherein:

the fit function is:

$$R_{spe}(i) = \sum_{j=1}^{n_{gr}} R_{gr}^j(i) + \sum_{j=1}^{n_{pr}} P_{pr}^j(i) \cdot R_{pr}^j(i - i_s) + \sum_{j=1}^{n} P_j(i);$$

there are an integer $n_{gr}$, calculated functions and respective line groups;

$R_{gr}^j(i)$ represents the $j^{th}$ calculated function which is a response value of a line group j;

there are $n_{pr}$ profiles each in a respective region of interest;

$R_{pr}^j(i-i_s)$ represents the $j^{th}$ profile;

$P_{pr}^j(i)$ is a profile modifying function for the $j^{th}$ profile;

$i_s$ is a shift parameter for the profiles;

$R_{spe}(i)$ is the measured sample spectrum; and $\Sigma_{j=1}^{n} P_j(i)$ is the sum of n functions $P_j(i)$ representing additional physical effects modelled based on a Monte Carlo simulation, where n is an integer.

9. A computer program product for measuring X-ray spectra according to claim 8, wherein there is a single profiled ($n_{pr}$=1) corresponding to the complete spectrum.

10. A computer program product for measuring X-ray spectra according to claim 8, arranged to measure the reference spectrum in a plurality of samples and to take as the plurality of measured intensity values of the profile a sum or average of the measurements of the reference spectrum of the plurality of samples.

11. A computer program product for measuring X-ray spectra according to claim 8 wherein the function $\Sigma_{j=1}^{n} P_j(i)$ is taken as zero.

12. A computer program product for measuring X-ray spectra according to claim 8 wherein at least one function $P_j(i)$ is a polynomial.

13. An apparatus for measuring one or more components in a measured sample, comprising:

an instrument adapted to measure X-ray scattering; and a controller adapted to control the instrument, the controller comprising data storage for instructions configured to cause, when executed, the controller to perform steps comprising:

controlling the instrument to measure a reference spectrum as a plurality of measured values $R_{pr}(i)$ for a plurality of energy bins i from at least one reference sample;

selecting $n_{pr}$ region or regions of interest from the measured reference spectrum indexed by j corresponding to a plurality of energy bins i and recording, in the data storage, a profile $R_{pr}^j(i)$ for the respective plurality of energy bins, where $n_{pr}$ is a positive integer;

controlling the instrument to measure a sample spectrum from the measured sample as a plurality of intensity values $R_{spe}(i)$ for a plurality of energy bins i;

fitting the measured sample spectrum $R_{spe}(i)$ to a fit function to obtain a fitted sample spectrum; and determining the one or more components in the measured sample based upon the fitted sample spectrum; and recording the determined one or more components in the data storage, wherein the fit function is:

$$R_{spe}(i) = \sum_{j=1}^{n_{gr}} R_{gr}^j(i) + \sum_{j=1}^{n_{pr}} P_{pr}^j(i) \cdot R_{pr}^j(i - i_s) + \sum_{j=1}^{n} P_j(i);$$

there are an integer $n_{gr}$ calculated functions and respective line groups;

$R_{gr}^j(i)$ represents the $j^{th}$ calculated function which is a response value of a line group j;

there are $n_{pr}$ profiles each in a respective region of interest;

$R_{pr}^j(i-i_s)$ represents the $j^{th}$ profile;

$P_{pr}^j(i)$ is a profile modifying function for the $j^{th}$ profile;

$i_s$ is a shift parameter for the profiles;

$R_{spe}(i)$ is the measured sample spectrum; and $\Sigma_{j=1}^{n} P_j(i)$ is the sum of n functions $P_j(i)$ representing additional physical effects modelled based on a Monte Carlo simulation, where n is an integer.

* * * * *